Dec. 29, 1925.

D. V. BANES 1,567,103

AUTO CHAIN FASTENER

Filed June 4, 1924

D. V. Banes, Inventor

By C. A. Snow & Co.
Attorney

Patented Dec. 29, 1925.

1,567,103

UNITED STATES PATENT OFFICE.

DONALD V. BANES, OF KINROSS, IOWA.

AUTO-CHAIN FASTENER.

Application filed Jnue 4, 1924. Serial No. 717,785.

*To all whom it may concern:*

Be it known that I, DONALD V. BANES, a citizen of the United States, residing at Kinross, in the county of Keokuk and State of Iowa, have invented a new and useful Auto-Chain Fastener, of which the following is a specification.

This invention relates to anti-skid chain securing devices and aims to provide novel means whereby the ends of the supporting chains of the anti-skid chain structure may be removably secured together, the securing device being such as to hold the supporting chains against accidental displacement.

Another important object of the invention is to provide a device of this character which may be readily and easily positioned on an anti-skid chain, the structure being such as to lock the skid chain in its active position under excessive strain brought to bear thereon.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
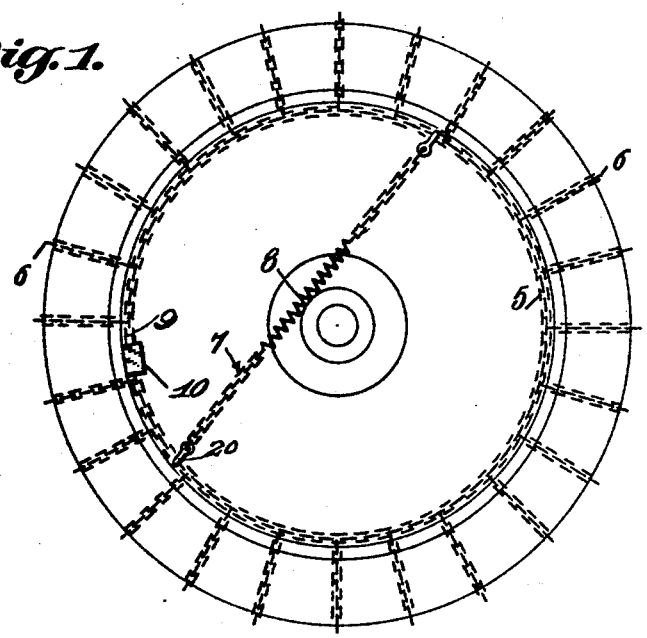
Figure 1 is a side elevational view of a skid chain disclosing a device constructed in accordance with the invention as positioned thereon.
Figure 2:
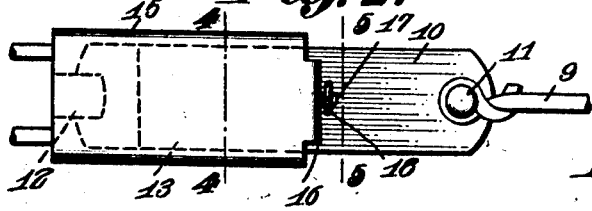
Figure 2 is a detail view of the securing member forming a part of the fastening device.
Figure 4:
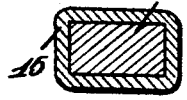
Figure 4 is a sectional view taken on line 4—4 of Figure 2.
Figure 5:
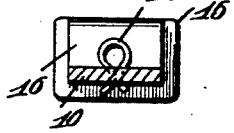
Figure 5 is a sectional view taken on line 5—5 of Figure 2.

Referring to the drawing in detail, the anti-skid chain which is shown as positioned on a wheel is of the usual construction and embodies supporting chain sections 5 and tread sections 6 which have their ends connected to the sections 5 in the usual and well known manner.

Figure 3:
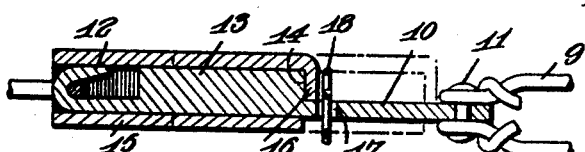
Figure 3 is a longitudinal sectional view through the fastening device.

The device forming the essence of the invention and which is employed for connecting the adjacent ends of the chain supporting sections 5 includes a bar 10 which is formed with a hook member 12 that extends inwardly and overlies a portion of the bar 10. As clearly shown by Figure 3 of the drawings, the bar 10 is formed with an enlarged portion 13 defining a shoulder 14 which acts as a stop for the slidable housing 15 to restrict movement of the housing. A downwardly extended tongue 16 is formed with one end of the housing and engages the shoulder 14. The reference character 17 defines an opening in the bar 10, which opening is arranged adjacent to the shoulder 14 and is designed to accommodate the cotter pin 18 when the housing 15 has been moved to its locking position, or to a position as shown by Figure 3 of the drawing.

When it is desired to connect the ends of the chain supporting sections 5, the housing is moved to a position to expose the hook member 12, whereupon the hook member is moved into engagement with one of the end links of the chain, whereupon the housing is moved to a position over the hook member to prevent displacement of the fastening device.

With the housing in this position, a cotter key is positioned in the opening 17 of the bar 10 to prevent movement of the housing 15 to expose the hook member 12 and permit the hook member to become disconnected.

The opposite ends of the chain supporting sections 5 indicated at 9 have connection with the bars 10 of the connecting devices at 11. It is contemplated to employ in connection with the anti-skid chain, chains 7 provided with hooks 20 at their outer ends to permit the chains 7 to be secured to the supporting chain sections 5, the inner ends of the chains 7 being connected by means of the coiled spring 8, which normally act to urge the inner ends of the chains 7 towards each other and take up any slack that may be present in the supporting chains 5.

When it is necessary to remove the anti-skid chains, it is only necessary to remove the cotter pins 18 and slide the housings of the fastening members to points to expose the hooks, whereupon the hooks may be readily disconnected to release the chain.

I claim:—

A connecting device for connecting the ends of chains, and including a body portion comprising a bar having an enlarged portion formed with a shoulder at its inner end and having a hook formed integral therewith, a slidable housing adapted to move over the body portion to close the hook member, said housing having a downwardly extended tongue adapted to engage the shoulder, said body portion having an opening arranged adjacent to the shoulder, a cotter key adapted to be positioned in the opening, said cotter key adapted to cooperate with the shoulder to restrict movement of the housing, and said hook adapted to be housed by the housing.

In testimony that I claim the foregoing as my own, I have hereto affixed my signature.

DONALD V. BANES.